United States Patent
Foundeur et al.

(10) Patent No.: US 7,657,066 B2
(45) Date of Patent: Feb. 2, 2010

(54) METHOD OF DETERMINING THE LIVING CHARACTER OF AN ELEMENT CARRYING A FINGERPRINT

(75) Inventors: Jean-Christophe Foundeur, Levallois-Perret (FR); Laurent Lambert, Paris (FR)

(73) Assignee: Sagem Securite, Paris (FR)

(*) Notice: Subject to any disclaimer, the term of this patent is extended or adjusted under 35 U.S.C. 154(b) by 225 days.

(21) Appl. No.: 10/539,823

(22) PCT Filed: Dec. 19, 2003

(86) PCT No.: PCT/FR03/03804

§ 371 (c)(1),
(2), (4) Date: Dec. 16, 2005

(87) PCT Pub. No.: WO2004/061758

PCT Pub. Date: Jul. 22, 2004

(65) Prior Publication Data

US 2006/0159314 A1    Jul. 20, 2006

(30) Foreign Application Priority Data

Dec. 20, 2002  (FR) .................................. 02 16736

(51) Int. Cl.
*G06K 9/00* (2006.01)
*G06F 7/04* (2006.01)
*G06T 1/00* (2006.01)
*G06T 7/00* (2006.01)

(52) U.S. Cl. .................... 382/124; 382/115; 340/5.52; 340/5.53; 340/5.8; 340/5.81; 340/5.83

(58) Field of Classification Search ................. 382/115, 382/124; 340/5.52, 5.53, 5.8, 5.81, 5.82, 340/5.83

See application file for complete search history.

(56) References Cited

U.S. PATENT DOCUMENTS 5,088,817 A * 2/1992 Igaki et al. .................... 356/71

(Continued)

FOREIGN PATENT DOCUMENTS

EP          1 187 057 A2      3/2002

(Continued)

OTHER PUBLICATIONS

Derakhshani et al. "Determination of Vitality from a Non-Invasive Biomedical Measurement for use in Fingerprint Scanners" Journal of Pattern Recognition Society 36 (2003), pp. 383-296.*

(Continued)

*Primary Examiner*—Andrew W Johns
*Assistant Examiner*—Mia M Thomas
(74) *Attorney, Agent, or Firm*—Gerald E. Helget; Nelson R. Capes; Briggs and Morgan, P.A.

(57) ABSTRACT

The present invention concerns a method of determining the living character of an element carrying a fingerprint. The method according to the invention is characterised in that it consists of making on the one hand at least one electrical measurement and on the other hand taking an image of the said fingerprint, and then validating the said or each electrical measurement by comparing it with the range of values of electrical measurements defined by a pre-established relationship linking the said range to characteristics of the said image.

11 Claims, 1 Drawing Sheet

U.S. PATENT DOCUMENTS

| | | | | |
|---|---|---|---|---|
| 5,963,657 | A * | 10/1999 | Bowker et al. | 382/127 |
| 6,067,368 | A * | 5/2000 | Setlak et al. | 382/124 |
| 6,175,641 | B1 * | 1/2001 | Kallo et al. | 382/124 |
| 6,263,091 | B1 * | 7/2001 | Jain et al. | 382/125 |
| 6,292,576 | B1 * | 9/2001 | Brownlee | 382/124 |
| 6,411,726 | B1 * | 6/2002 | Pires | 382/124 |
| 6,560,352 | B2 * | 5/2003 | Rowe et al. | 382/115 |
| 6,601,056 | B1 * | 7/2003 | Kagle et al. | 707/1 |
| 6,665,428 | B1 * | 12/2003 | Gozzini | 382/124 |
| 6,826,000 | B2 * | 11/2004 | Lee et al. | 359/833 |
| 6,888,956 | B2 * | 5/2005 | Muramatsu et al. | 382/124 |
| 6,912,165 | B2 * | 6/2005 | Corson et al. | 365/189.05 |
| 6,952,490 | B2 * | 10/2005 | Lee | 382/124 |
| 7,181,052 | B2 * | 2/2007 | Fujieda | 382/124 |
| 7,200,250 | B2 * | 4/2007 | Chou | 382/124 |
| 7,203,345 | B2 * | 4/2007 | Rowe et al. | 382/115 |
| 7,440,596 | B2 * | 10/2008 | Kondo et al. | 382/124 |
| 7,576,843 | B2 * | 8/2009 | Rouget et al. | 356/71 |
| 2002/0030581 | A1 * | 3/2002 | Janiak et al. | 340/5.53 |
| 2003/0025679 | A1 * | 2/2003 | Taylor et al. | 345/175 |
| 2003/0044051 | A1 * | 3/2003 | Fujieda | 382/124 |
| 2003/0165261 | A1 * | 9/2003 | Johansen et al. | 382/124 |
| 2003/0223621 | A1 * | 12/2003 | Rowe et al. | 382/115 |
| 2004/0252867 | A1 * | 12/2004 | Lan et al. | 382/124 |
| 2005/0008197 | A1 * | 1/2005 | Dennis | 382/115 |
| 2005/0063575 | A1 * | 3/2005 | Ma et al. | 382/128 |
| 2005/0069178 | A1 * | 3/2005 | Nysaether et al. | 382/124 |

FOREIGN PATENT DOCUMENTS

| | | | |
|---|---|---|---|
| EP | 02252601.6 | * | 12/2002 |
| WO | WO 01/24700 A1 | | 4/2001 |
| WO | WO 01-65466 A2 | | 9/2001 |
| WO | WO 01/65470 A1 | | 9/2001 |

OTHER PUBLICATIONS

"Fingerprint capacitive cadaver" Google Scholar Search, pp. 1 of 2.*
Rutty et al. "Electronic Fingerprinting of the Dead", Int J Legal Med (2008) Springer-Verlag 2007,122: pp. 77-80.*

* cited by examiner

METHOD OF DETERMINING THE LIVING CHARACTER OF AN ELEMENT CARRYING A FINGERPRINT

BACKGROUND OF THE INVENTION

The present invention concerns a method of checking the living character of a finger by means of a fingerprint sensor. The invention also confirm the fingerprint sensor for implementing this method.

In general terms, any protected access becomes accessible to an authorized person by a means that he alone possesses. One of the means of limiting access to a person is to require the fingerprint of this person. The image of the fingerprint of a person is obtained by a fingerprint sensor. Once the image of the print is obtained by the sensor, it is transmitted to an image processing unit that compares the image obtained with a bank of print images so as to check that the print taken by the sensor is known. Recognition of the print by the image processing unit then opens up, to the person to whom the print corresponds, access to that which he seeks.

It has been found that, although identification by fingerprints is a known method, it still poses problems. This is because there are many forgers who attempt to deceive fingerprint sensors with imitations. The artifices in particular used are false fingers.

In order to thwart such forgers, several methods have been proposed for determining whether the element carrying the fingerprint is living. Certain methods use optical means. This is for example the case with the document U.S. Pat. No. 5,719,950, which describes a method consisting of measuring biometric parameters such as the oxygen level in the blood, the temperature of the skin, etc. The document U.S. Pat. No. 5,737,439 describes an optical measurement system for detecting blood flow by means of two wavelengths. Other methods consist of making electrical measurements. This is the case with the document JP-A-11197135, which describes the measurement of variations in capacitance between two electrodes, and the document U.S. Pat. No. 5,953,441, which describes a device for measuring the complex impedance of the finger and comparing it with reference curves which are a function of frequency.

It has been found through the measures already known that the measurement of the impedance of the finger is one of the methods best suited to checking the living character of a finger. The technique consists of measuring an impedance Z between two electrodes and comparing the value obtained by this measurement with a range of values considered to be acceptable. The technique is still sometimes deceived by imitations and discrimination errors remain numerous.

BRIEF SUMMARY OF THE INVENTION:

The aim of the invention is therefore to propose a method of determining the living character of an element carrying a fingerprint by means of a fingerprint sensor.

To this end, the invention concerns a method of determining the living character of an element carrying a fingerprint, by making on the one hand at least one electrical measurement and on the other hand producing an image of the fingerprint, then validating each electrical meausrement by comparing it with a range of value sof electrical measurements defined by a pre-established relationship linking the range with characteristics of the image.

According to another characteristic of the invention, the electrical measurement is a meausrement of impedance.

According to another characteristic of the invention, the method consists of linking the characteristics of the image of the print and the range of acceptable values, grouping together the characteristics of the image in the form of a grade, the grade corresponding to a range of values of predefined electrical measurements.

The invention also concerns a fingerprint sensor making it possible to determine the living character of an element carrying a fingerprint.

The characteristics of the invention mentioned above as well as others will emerge more clearly from a reading of the following description of an example embodiment, the said description-being given in relation to the accompanying drawings, amongst which:

DETAILED DESCRIPTION OF THE INVENTION

Figure 1:
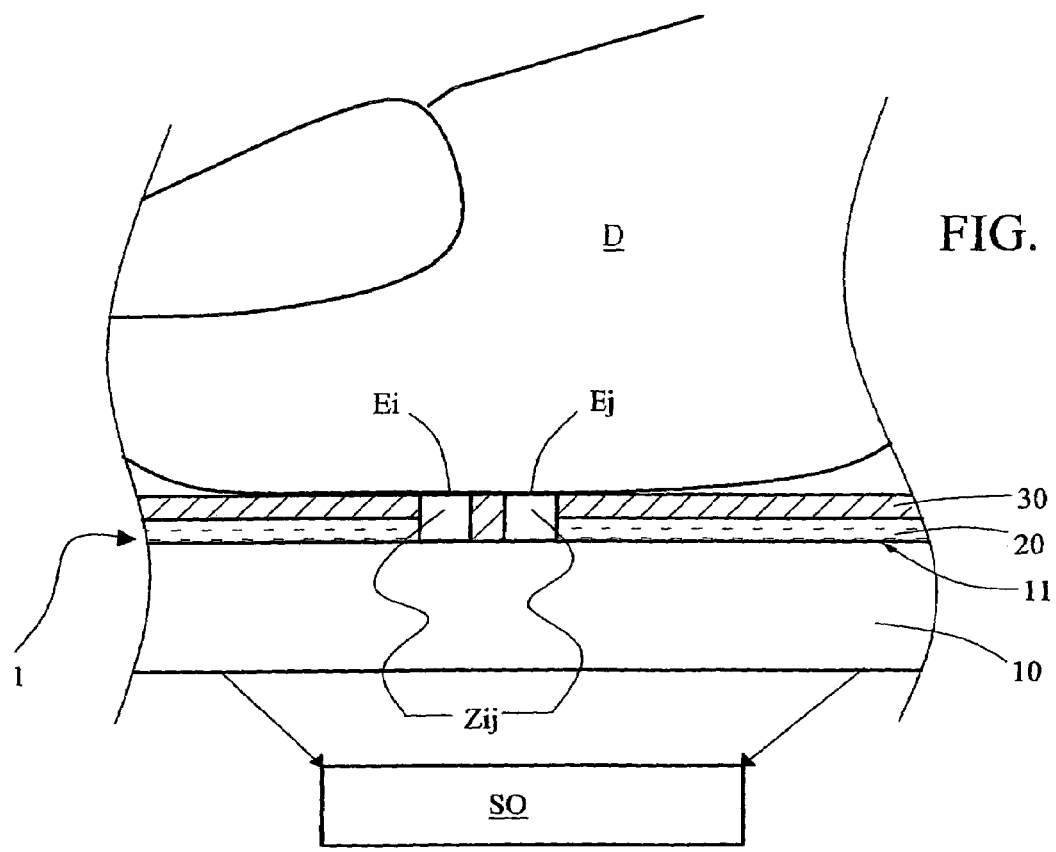
FIG. 1 depicts a fingerprint sensor according to the invention covered with an element carrying a print.

In the method according to the invention, the determination of the living character of an element carrying a fingerprint is made by electrical measurements on it. These measurements preferably consist of measurements of impedance. The measurement of the impedance Z is made, as depicted in FIG. 1, by a fingerprint sensor 1 placed in contact with the element carrying the print, here represented by a finger D. An optical system SO is placed at the base of the sensor 1 so as to produce an image of the print of the finger D. The fingerprint sensor 1 according to the invention comprises a plate 10 of transparent material, for example glass or transparent plastics material, making it optically possible to photograph the print of the finger D. On the surface 11 of this plate 10 electrodes Ei and Ej are disposed, between which an impedance Zij is measured. Measurement of the impedance Zij between the electrodes Ei, Ej is made possible by virtue of conductive transparent connections 20. These connections 20, also placed in contact with the plate 10, must necessarily be conductive and transparent so as to enable the sensor 1 to fulfill both its function as an image sensor and its function as a verifier of the living character of the finger. The transparency of the connections 20 is preferably obtained by a vacuum deposition of a very fine layer of material, preferably ITO (Indium Tin Oxide), with a thickness of less than one micrometer. The whole of the surface of the sensor 1 with the exception of the electrodes Ei, Ej is covered with a layer of an insulating material 30 offering only the electrodes Ei, Ej in contact with the finger D.

In the method according to the invention, on the one hand the measurement of the impedance Zij of the finger D between two electrodes Ei, Ej is made and on the other hand the image Ie of the print of this finger D is produced by means of the optical system SO. Measuring the impedance Zij makes it possible to verify the living character of the finger by comparing the value of the impedance Zij measured with a range Iv of values judged to be acceptable for a living finger. This range of values must be defined with precision in order to accept all living fingers, even those having unusual characteristics, but rejecting false fingers having characteristics close to living fingers. This range Iv of acceptable values is defined in the invention for each of the fingers D present on the sensor 1 according to the characteristics of the image Ie of the print.

FIGS. 2a, 2b, 3a, 3b depict a finger D and the image Ie of its print. In these figures, it can be seen that the print of the finger D has a relief formed from hollows, also referred to as valleys V, and protrusions, also referred to as ridges R (ridges in English terminology). On the image Ie of the print, the valleys V appear in black and the ridges R in white. Each finger D at a given time T, gives a unique image Ie possessing particular characteristics. These characteristics are for example the contrast, the average greyscale of the images, the width of the ridges R, the average greyscale of the ridges, etc. The characteristics of the image Ie are due to characteristics of the finger D, such as for example the moisture. In practice, the various characteristics of the image Ie are collected together in the form of a grade, for example between 0 and 1. Therefore an image Ic of a given print corresponds to a given grade.

Figure 2A:
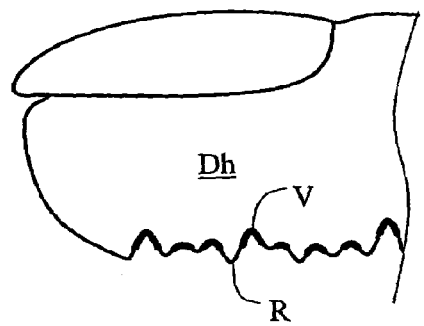
FIG. 2a depicts an element carrying a print where the print is wet.
Figure 2B:
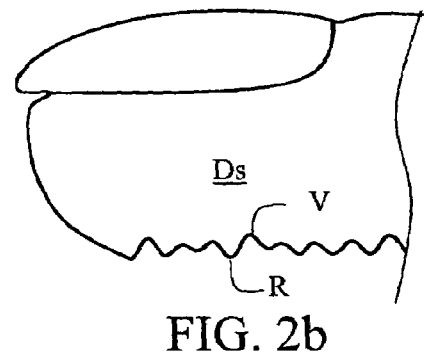
FIG. 2b depicts an element carrying a print where the print is dry.
Figure 3A:
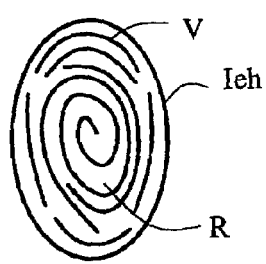
FIG. 3a depicts the image of a wet print taken by the fingerprint sensor according to the invention.
Figure 3B:
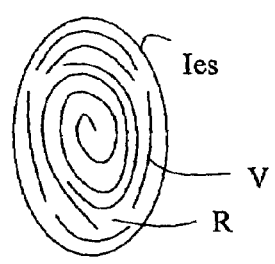
FIG. 3b depicts the image of a dry print taken by the fingerprint sensor according to the invention.

A moist finger Dh has been shown by way of example in FIG. 2a. The image Ieh of a print of this moist finger Dh has particular characteristics. It can be seen for example in FIG. 3a that a moist finger Dh brings out the contrast of the image Ieh of the print. Inversely it can be seen in FIGS. 2b and 3b that a dry finger Ds gives an image Ies of the print of this finger Ds that is not highly contrasted. It will be noted that the moisture of the finger D is not the only characteristic of the finger D to act on the characteristics of the image Ie. In general terms, several characteristics of the finger D have an influence on several characteristics of the image Ie of the print.

In the method according to the invention, several of the characteristics of the image Ie of the print of the finger D are used to determine the grade corresponding to the image Ie of the print. Each grade between 0 and 1 is associated with a range Iv of predefined impedance values. Thus, from the image Ie of the print of the finger D, a grade is determined corresponding to a range Iv of possible values for the finger D at a given time T. Next the impedance value Zia found by the measurement between two electrodes is compared with this range Iv of acceptable values and it is verified that the impedance value Zij measured belongs to the range Iv thus defined. If the impedance value Zij measured belongs to the range Iv, it will then be accepted that the finger D is living, otherwise the finger D will be rejected by the sensor 1.

The method according to the invention can be implemented in parallel to other methods of determining the living character of an element carrying a fingerprint, such as for example a method consisting of verifying the correlation between the impedance measured and the surface area of the measuring electrode

The invention claimed is:

1. A method using a processor or computer to perform the steps of determining a living character of a finger, of a user carrying a fingerprint and said finger being placed on a fingerprint sensor having an optical system, the method comprising the steps of:
   (a) measuring an electrical quantity of the finger;
   (b) taking an image of the fingerprint carried by the finger by means of the optical system;
   (c) measurement of a particular characteristic of the image, said particular characteristic being selected from the group consisting of: the contrast of the image, the average greyscale of the image, the width of the images of the ridges formed by the said fingerprints, and the average greyscale of the ridges;
   (d) deducing from the particular characteristic thus measured, a range of values for the electrical quantity of the finger judged in principle acceptable using a relationship established between values of the particular characteristic of the image and the range of said values of the electrical quantity of the finger judged acceptable; and
   (e) validation of the living character of the finger when the measured electrical quantity belongs to the deduced of values.

2. A method according to claim 1, wherein the fingerprint sensor has electrodes, and wherein the electrical quantity is an impedance which value is measured at the terminals of said electrodes.

3. The method of claim 1, wherein the step (c) further comprises a step of collecting the characteristics of the image together to form a grade between 0 and 1.

4. A fingerprint sensor adapted to determine a living character of a finger, of a user carrying a fingerprint, said finger being placed on the fingerprint sensor, the sensor comprising:
   (a) means of measuring an electrical quantity of the finger;
   (b) an optical system for taking an image of the fingerprint carried by the finger by means of the optical system;
   (c) means for measuring a particular characteristic of the image, said particular characteristic being selected from the group consisting of: the contrast of the image, the average greyscale of the image, the width of the images of the ridges formed by the said fingerprints, and the average greyscale of the said ridges;
   (d) means of deducing from the particular characteristic thus measured, a range of values for the electrical quantity judged in principal acceptable using a relationship established between values of the particular characteristic of the image and the range of values of the electrical quantity of the finger judged acceptable; and
   (e) means of validating the living character of the finger when the measured value of the electrical quantity belongs to the deduced range.

5. A fingerprint sensor according to claim 4, wherein the means of measuring an electrical quantity is a means of measuring impedance at the terminals of electrodes.

6. A fingerprint sensor according to claim 5, wherein the electrodes are formed on a transparent plate, the connections to the electrodes being conductive and also transparent.

7. A sensor according to claim 4, wherein the means for measuring a particular characteristic of the image further comprises a grade between 0 and 1 formed from a collection of the characteristics of the image.

8. A method of using a processor or computer to perform the steps of determining a living character of a finger of a user carrying a fingerprint and the finger being placed on a fingerprint sensor having an optical system and a transparent conductive impedance electrode measuring system, the method comprising the steps of:
   (a) measuring an electrical impedance quantity of the finger by the transparent conductive impedance electrode measuring system;
   (b) taking of a visible image of the fingerprint carried by the finger by the optical system;
   (c) measuring with the processor a particular characteristic value of the image, the particular characteristic value selected from a group consisting of: the contrast of the image, the average greyscale of the image, the width of the images of the ridges formed by the fingerprint, and the average greyscale of the ridges;

(d) deducing from the particular characteristic value thus measured with the processor a range of the electrical impedance quantities of the finger judged in principle acceptable using a relationship established between the electrical impedance quantity of the particular characteristic value of the image and the range of the impedance quantities of the finger judged acceptable; and (e) validating with the processor the living characteristic value of the finger when the measured electrical impedance quantity belongs to the deduced range of impedance quantities.

9. A fingerprint sensor adapted to determine the living character of a finger, of a user carrying a fingerprint, the finger being placed on the fingerprint sensor, the sensor comprising:

(a) means of measuring an electrical impedance quantity of the finger;

(b) an optical system for taking an image of the fingerprint carried by the finger;

(c) means of measuring a particular characteristic value of the image, the particular characteristic value being selected from a group consisting of: the contrast of the image, the average greyscale of the image, the width of the images of the ridges formed by the fingerprint, and the average greyscale of the ridges;

(d) means of deducing from the particular characteristic value thus measured, a range of the electrical quantities judged in principle acceptable using a relationship established between the impedance quantity of the particular characteristic value of the image and the range of impedance quantity judged acceptable; and (e) means of validating the living character of the finger when the measured electrical quantity belongs to the deduced range.

10. A sensor according to claim 9, wherein the means of measuring an electrical quantity is a means of measuring impedance at terminals of electrodes.

11. A sensor according to claim 10, wherein the electrodes are formed on a transparent plate, the connections to the electrodes being conductive and also transparent.

* * * * *

UNITED STATES PATENT AND TRADEMARK OFFICE
CERTIFICATE OF CORRECTION

PATENT NO. : 7,657,066 B2 Page 1 of 1
APPLICATION NO. : 10/539823
DATED : February 2, 2010
INVENTOR(S) : Jean-Christophe Fondeur and Laurent Lambert It is certified that error appears in the above-identified patent and that said Letters Patent is hereby corrected as shown below:

Title page, Item (75) Inventors:, replace "Jean-Christophe Foundeur" with
-- Jean-Christophe Fondeur --.

In column 4, line 11, after "deduced" and before "of"; insert -- range --.

Signed and Sealed this

Third Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,657,066 B2  Page 1 of 1
APPLICATION NO. : 10/539823
DATED : February 2, 2010
INVENTOR(S) : Fondeur et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 346 days.

Signed and Sealed this

Thirtieth Day of November, 2010

David J. Kappos
*Director of the United States Patent and Trademark Office*